United States Patent
Wilinski et al.

(10) Patent No.: US 6,563,873 B1
(45) Date of Patent: May 13, 2003

(54) VIDEO SIGNAL PROCESSING

(75) Inventors: Piotr Wilinski, Eindhoven (NL); Cornelis W. A. M. Van Overveld, Eindoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/525,693

(22) Filed: Mar. 14, 2000

(30) Foreign Application Priority Data

Mar. 18, 1999 (EP) .......................... 99200849

(51) Int. Cl.[7] .................. H04B 1/66; G06K 9/36; H04N 9/64
(52) U.S. Cl. .................. 375/240.12; 375/240.16; 382/236; 348/699
(58) Field of Search ............... 375/204.12, 240.16, 375/240.24, 240.01, 240.08; 382/233, 232, 236, 173, 190, 238, 242, 243; 348/699, 700, 420.1, 416.1, 402.1, 413.1

(56) References Cited

U.S. PATENT DOCUMENTS

| | | | |
|---|---|---|---|
| 5,526,295 A | * 6/1996 | Astle | 382/232 |
| 5,583,580 A | 12/1996 | Jung | |
| 5,793,430 A | 8/1998 | Hackett et al. | 348/416 |
| 5,929,940 A | * 7/1999 | Jeannin | 348/699 |
| 5,995,668 A | * 11/1999 | Corset et al. | 375/240.16 |
| 6,130,964 A | * 10/2000 | Marques et al. | 382/236 |
| 6,137,913 A | * 10/2000 | Kwak et al. | 382/236 |
| 6,157,745 A | * 12/2000 | Salembier | 382/236 |
| 6,173,077 B1 | * 1/2001 | Trew et al. | 382/236 |

FOREIGN PATENT DOCUMENTS

| EP | 0397206 B1 | 11/1990 |
|---|---|---|
| EP | 0720382 A1 | 7/1996 |

OTHER PUBLICATIONS

"Block matching motion estimation using block integration based on reliability metric", by T. Yoshida, H. Katoh, and Y. Sakai, Proceedings Internaitonal Conference on Image Processing, pp. 152–155, vol. II of III, Oct. 26–29, 1997, Santa Barbara, California.

"Global motion estimation for image sequence coding applications", by Z. Eisips and D. Malah, $17^{th}$ Convention of electrical and electronical engineers in Israel, Proc. 1991, pp. 186–189.

"Tree-structured scene Adaptive coder", IEEE transactions on communications, vol. 38, No. 4, Apr. 1990, pp. 477–486.

* cited by examiner

*Primary Examiner*—Gims S. Philippe
(74) *Attorney, Agent, or Firm*—Edward W. Goodman

(57) ABSTRACT

In a video signal processing method, video signal parts are labeled (L) as non-matchable parts (N-M) if reliable motion or depth information (d1, d2) cannot be obtained for such parts (N-M), motion or depth information (d1, d2) is generated for the video signal (V), and motion or depth information (d1, d2) is produced for the non-matchable parts (N-M) of the video signal (V) from the motion or depth information generated for the video signal (V).

18 Claims, 1 Drawing Sheet

VIDEO SIGNAL PROCESSING

BACKGROUND OF THE INVENTION

1. Field of the Invention

Figure 1:
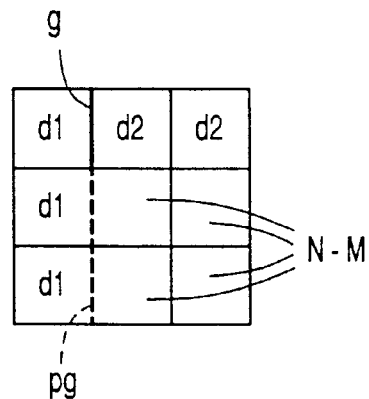

The invention relates to a method and device for video signal processing. More specifically, the invention relates to motion and/or depth estimation.

2. Description of the Related Art

The paper "Block matching motion estimation using block integration based on reliability metric", by T. Yoshida, H. Katoh, and Y. Sakai, Proceedings International Conference on Image Processing, pp. 152–155, volume II of III, Oct. 26–29, 1997, Santa Barbara, Calif., proposes a motion estimation technique to improve accuracy and coherence of motion vectors. The proposed technique is based on a matching block integration using a reliability metric of motion vectors. First, the reliability metric is computed for all the matching blocks in the target image, and then, based on this value and its dependency on the direction, four neighboring matching blocks are checked whether they should be integrated or not. Finally, motion vectors are estimated for the integrated matching blocks by the block matching technique. Since the block integration is performed only for flat matching blocks or those with a simple edge, the coherence is improved while the performance of motion compensation is kept as far as possible.

The paper "Global motion estimation for image sequence coding applications", by Z. Eisips and D. Malah, 17th Convention of electrical and electronical engineers in Israel, Proc. 1991, pp. 186–189, describes an algorithm for the estimation of global motion in image sequences. The algorithm is based on block displacement estimates. The algorithm selects a set of most reliable block displacements and applies a least squares scheme to obtain an initial estimate of the model parameters out of these displacements. Then, a verification stage is used to discard blocks whose displacements are not compatible to this estimate. A block is well matched when the obtained mean absolute difference (MAD) is lower than a threshold. The match will be most reliable when this MAD is significantly better than the MAD without motion compensation. This may be seen as a way of avoiding the use of displacement estimates obtained for smooth image areas, as well as for noise-like textured areas, where real motion cannot be properly estimated by a local matching algorithm. Finally, a least squares scheme, using only the verified block displacements, is applied to obtain a finer estimate of the model parameters.

SUMMARY OF THE INVENTION

It is, inter alia, an object of the invention to provide an improved estimation technique. To this end, the invention provides a video signal processing method and a video signal processing device.

In a video signal processing method in accordance with a primary aspect of the invention, video signal parts are labeled as non-matchable parts if reliable motion or depth information cannot be obtained for such parts, motion or depth information is generated for the video signal, and motion or depth information is produced for the non-matchable parts of the video signal from the motion or depth information generated for the video signal.

These and other aspects of the invention will be apparent from and elucidated with reference to the embodiments described hereinafter.

BRIEF DESCRIPTION OF THE INVENTION

Figure 2:
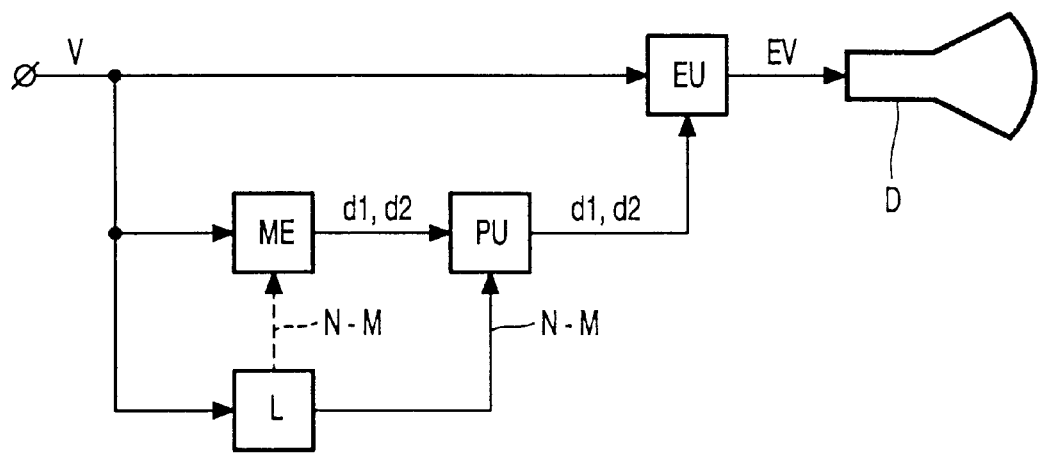

In the drawings:

FIG. 1 illustrates motion or depth propagation in the presence of a bordering gradient; and FIG. 2 shows an embodiment of a video signal processing device in accordance with the present invention.

DESCRIPTION OF THE PREFERRED EMBODIMENTS

The invention is based on the following recognitions. The depth-estimation in video images can be based on a block-matching motion estimation approach. Some blocks that can be called non-matchable may not contain enough information for an accurate matching. The invention proposes their definition and the rules to cope with them during and after the matching algorithm iterations.

The block-based structure from motion extraction proposes to divide the image: into blocks. Before the iterative matching process, the blocks are ordered. Several ways of doing it are possible. Instead of processing the blocks line by line one of the solutions is to order them following the amount of the textural information (confidence) that they contain. This way, the processing starts with regions which can provide the most accurate results. The blocks containing the poorest texture and, therefore, leading to a possible matching on noise, are processed at the last moment. During the matching process, the blocks are attributed new motion values, resulting from the best matching neighbor motion. It can be considered as a motion (depth) information propagation. This approach allows the propagation of the information in the image from highly textured regions to non-textured regions.

During one iteration over an image frame, all of the blocks are visited. consequently, all of the blocks can be the source of a new motion value. Considering a block having poor texture quality can have 2 situations:

the neighborhood of such a block is rich enough to propagate a correct motion information into this block; or the neighboring blocks are also low-textured and the matching quality can be high, because of the matching on noise.

In the first case, the algorithm copies the information from the best matching neighbor. As the best matching neighbor is selected from the high-confidence neighbors, we can be confident about the new motion value of the considered block.

In the second case, as the high-confidence blocks are chosen from a low textured area, the best matching block can match on noise and not on features. The motion value that is copied can have a low confidence. This gives rise to the generation of erroneous motion values which are spread in a low-textured neighborhood.

Another problem arising during the block matching is the problem of regions containing exactly the same blocks. They may be constituted, for example, by repetitive texture motifs that are spatially invariant. For such blocks, the best matching can be obtained for several values of motion and, therefore, depth. Those blocks being highly textured may become also generators of erroneous motion values.

The notion of a non-matchable block can be a solution. It is proposed to call a block non-matchable at the moment when its matching with the neighboring blocks cannot lead to an accurate result. For such blocks, it is proposed not to perform the block matching. It is proposed to call a compact region containing non-matchable blocks a non-matchable region.

We propose the following criterions to decide about the non-matchablity of the block:

The texture informational entropy of all the neighboring blocks can be below, a threshold of acceptability, e.g., in smooth image areas and/or with flat matching blocks.

The matching quality of the neighboring-blocks can be below a threshold of acceptability, i.e., the match error is too high.

The neighboring blocks can be identical as the considered block.

In one embodiment, entropy could be computed using the technique, as described in Ref. [2], where only 8 angles are used, so that the computation is efficient; however, cheaper approximations to the entropy can also be used.

The non-matchable blocks are masked until the last iteration of the algorithm. In the last iteration, the values from the blocks being in the neighborhood are copied to the region of non-matchable blocks.

To control the information propagation inside the non-matchable regions, it is proposed to propagate, inside a non-matchable region, the gradient information (the gradient of texture changes) from the surrounding matchable blocks. It is especially important when a non-matchable block is surrounded by matchable neighboring blocks of different motion. FIG. 1 explains the approach. The idea is to propagate the motion (depth) values in the way to prolong exterior gradients.

In FIG. 1, d1 and d2 indicate motion or depth information obtained for matchable blocks. N-M indicates non-matchable blocks. A fat line in the upper row indicates a gradient g. This gradient g is propagated in the vertical direction, indicated by an interrupted fat line pg. The value d2 is assigned to the non-matchable blocks N-M.

FIG. 2 shows an embodiment of a video signal processing device in accordance with the present invention. An input video signal V is applied to a labeling unit L, to a motion estimator ME, and to an enhancing unit EU. Optionally, an output signal of the labeling unit L is applied to the motion estimator ME so as to prevent the motion estimator ME from trying to obtain motion vectors for non-matchable blocks N-M. An output of the motion estimator ME is applied to a producing unit PU to obtain motion vectors for the non-matchable blocks N-M. The motion vectors for all blocks of the video signal are applied to the enhancing unit to generate an enhanced video signal EV having e.g., a doubled field rate. The enhanced video signal EV is applied to a display unit D.

A primary aspect of the invention can be summarized as follows. Reliable motion/depth information can be generated for blocks having a rich texture, but not for blocks having a poor texture. Moreover, even for blocks having a rich texture, there might be a problem if there is a region of identical blocks, e.g., comprising repetitive texture motifs that are spatially invariant. For such blocks, the best matching can be obtained for several values of motion/depth. It is proposed to label both types of blocks as non-matchable blocks. These blocks are masked until the last iteration of the algorithm. Thereafter, the values obtained for the matchable blocks are copied to the neighboring non-matchable blocks. Preferably, if there are whole regions of non-matchable blocks, the values from the neighboring matchable blocks are propagated into the non-matchable region along gradients (of texture changes) so as to avoid mixing up information from two differently moving objects. The invention results in a better motion/depth estimation quality. The invention is advantageously applied in depth reconstruction for static environments based on video sequences.

It should be noted that the above-mentioned embodiments illustrate rather than limit the invention, and that those skilled in the art will be able to design many alternative embodiments without departing from the scope of the appended claims. The word "comprising" does not exclude the presence of other element or steps than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware.

In the method claim, the order of the steps does not need to be the order in which the steps are recited in the claim. More specifically, the step of generating motion or depth information can be carried out before the step in which certain parts of the video signal are labeled as non-matchable; the generating step must be carried out before the labeling step if the match error is used to label parts of the video signal for which a high match error is obtained as non-matchable. However, if the labeling step is based on texture information in that little texture results in the label "non-matchable", the labeling step can be carried out before the motion or depth information generating step; carrying out the labeling step before the generating step now results in the advantage that the generating step only needs to be carried out for those video signal parts that are not labeled as non-matchable.

References:

[1] G. de Haan, Motion Estimation and Compensation. An integrated approach to consumer display field rate conversion", Ph.D. thesis, 1992.

[2] Piotr Wilinski and Kees van Overveld, "Depth From Motion using Confidence Based Block Matching", Image and Multidimensional Digital Signal Processing Workshop, Alpbach, Austria, July 1998.

[3] Piotr Wilinski and Overeld, "Motion or depth estimation", PCT aplication no. pct/IB99/00162U.S. patent application Ser. No. 09/241,957, filed Feb. 2, 1999.

What is claimed is:

1. A video signal processing method, comprising the steps:

labeling parts of a video signal as non-matchable parts if reliable motion or depth information cannot be obtained for such parts;

generating motion or depth information for said video signal; and producing motion or depth information for said non-matchable parts of said video signal from said motion or depth information generated for said video signal, wherein a part of the video signal is labeled as non-matchable if a texture information entropy of neighboring parts is below a first threshold.

2. The video signal processing method as claimed in claim 1, wherein said producing step includes the step:

copying motion or depth information values from parts of said video signal adjacent to said non-matchable parts, to said non-matchable parts.

3. The video signal processing method as claimed in claim 1, wherein said producing step includes the step:

propagating gradient information from surrounding parts of said video signal inside a non-matchable part so as to prolong gradients exterior to said non-matchable parts.

4. A video signal processing device, comprising:
   means for labeling parts of a video signal as non-matchable parts if reliable motion or depth information cannot be obtained for such parts;
   means for generating motion or depth information for said video signal; and
   means for producing motion or depth information for said non-matchable parts of said video signal from said motion or depth information generated for said video signal,
wherein a part of the video signal is labeled as non-matchable if a texture information entropy of neighboring parts is below a first threshold.

5. The video signal processing device as claimed in claim 4, characterized in that the video signal processing device further comprises:
   means for enhancing said video signal in dependence upon said motion or depth information to obtain an enhanced signal.

6. The video signal processing device as claimed in claim 5, characterized in that the video signal processing device further comprises:
   means for displaying said enhanced signal.

7. The video signal processing method as claimed in claim 1, wherein a part of the video signal is labeled as non-matchable if the texture information entropy of neighboring pars is below the first threshold, and a matching quality of the neighboring parts, is below a second threshold.

8. The video signal processing method as claimed in claim 1, wherein a part of the video signal is labeled as non-matchable if the texture information entropy of neighboring parts is below the first threshold, and the neighboring parts are identical to said part of the video signal.

9. The video signal processing method as claimed in claim 7, wherein a part of the video signal is labeled as non-matchable if the texture information entropy of neighboring parts is below the first threshold, the matching quality of the neighboring parts is below the second threshold, and the neighboring parts are identical to said part of the video signal.

10. A video signal processing method comprising the steps:
    labeling parts of a video signal as non-matchable parts if reliable motion or depth information cannot be obtained for such parts;
    generating motion or depth information for said video signal; and
    producing motion or depth information for said non-matchable parts of said video signal from said motion or depth information generated for said video signal,
wherein a part of the video signal is labeled as non-matchable if a matching quality of neighboring parts is below a threshold.

11. The video signal processing method as claimed in claim 10, wherein a part of the video signal is labeled as non-matchable if the matching quality of the neighboring parts is below the threshold, and the neighboring parts are identical to said part of the video signal.

12. A video signal processing method comprising the steps:
    labeling parts of a video signal as non-matchable parts if reliable motion or depth information cannot be obtained for such parts;
    generating motion or depth information for said video signal; and
    producing motion or depth information for said non-matchable parts of said video signal from said motion or depth information generated for said video signal,
wherein a part of the video signal is labeled as non-matchable if neighboring parts are identical to said part of the video signal.

13. The video signal processing device as claimed in claim 4, wherein a part of the video signal is labeled as non-matchable if the texture information entropy of neighboring pars is below the first threshold, and a matching quality of the neighboring parts is below a second threshold.

14. The video signal processing device as claimed in claim 4, wherein a part of the video signal is labeled as non-matchable if the texture information entropy of neighboring parts is below the first threshold, and the neighboring parts are identical to said part of the video signal.

15. The video signal processing device as claimed in claim 13, wherein a part of the video signal is labeled as non-matchable if the texture information entropy of neighboring parts is below the first threshold, the matching quality of the neighboring parts is below the second threshold, and the neighboring parts are identical to said part of the video signal.

16. A video signal processing device, comprising;
    means for labeling parts of a video signal as non-matchable parts if reliable motion or depth information cannot be obtained for such parts;
    means for generating motion or depth information for said video signal; and
    means for producing motion or depth information for said non-matchable parts of said video signal from said motion or depth information generated for said video signal,
wherein a part of the video signal is labeled as non-matchable if a matching quality of neighboring parts is below a threshold.

17. The video signal processing device as claimed in claim 16, wherein a part of the video signal is labeled as non-matchable if the matching quality of the neighboring parts is below the threshold, and the neighboring parts are identical to said part of the video signal.

18. A video signal processing device, comprising:
    means for labeling parts of a video signal as non-matchable parts if reliable motion or depth information cannot be obtained for such parts;
    means for generating motion or depth information for said video signal; and
    means for producing motion or depth information for said non-matchable parts of said video signal from said motion or depth information generated for said video signal,
wherein a part of the video signal is labeled as non-matchable if neighboring parts are identical to said part of the video signal.

* * * * *